United States Patent [19]

Reil

[11] Patent Number: 4,743,326

[45] Date of Patent: May 10, 1988

[54] METHOD AND APPARATUS FOR MAKING PACKAGING MEANS HAVING REINFORCING STRIPS

[75] Inventor: Wilhelm Reil, Bensheim, Fed. Rep. of Germany

[73] Assignee: Tetra Pak Developpement S.A., Switzerland

[21] Appl. No.: 919,570

[22] Filed: Oct. 20, 1986

Related U.S. Application Data

[60] Continuation of Ser. No. 725,034, Apr. 19, 1985, abandoned, which is a division of Ser. No. 431,921, Sep. 30, 1982, Pat. No. 4,526,314.

[30] Foreign Application Priority Data

Oct. 10, 1981 [DE] Fed. Rep. of Germany ....... 3140336

[51] Int. Cl.⁴ .................... B32B 31/18; B32B 31/20; B32B 27/10
[52] U.S. Cl. .................... 156/251; 156/292; 156/308.4; 156/515; 156/530; 156/553; 156/580.1; 156/583.1
[58] Field of Search ............... 156/209, 219, 220, 292, 156/553, 518, 519, 521, 530, 581, 583.1, 522, 515, 251, 308.4; 493/85, 86, 93–99, 133–135, 129; 226/162

[56] References Cited

U.S. PATENT DOCUMENTS

| | | | |
|---|---|---|---|
| 417,587 | 12/1889 | Remus | 156/211 |
| 2,284,727 | 6/1942 | Cunnington | 156/70 |
| 2,543,004 | 2/1951 | Dewyer | 156/521 |
| 2,558,918 | 7/1951 | Zinn | 229/DIG. 4 |
| 2,849,933 | 9/1958 | von Hofe | 493/133 |
| 3,984,278 | 10/1976 | Styner | 156/522 |
| 4,214,944 | 7/1980 | Lemke | 156/521 |
| 4,360,140 | 11/1982 | Morris | 226/162 |

FOREIGN PATENT DOCUMENTS

2129408 12/1972 Fed. Rep. of Germany ...... 156/209

*Primary Examiner*—Donald E. Czaja
*Assistant Examiner*—J. Davis
*Attorney, Agent, or Firm*—Biebel, French & Nauman

[57] ABSTRACT

A packaging for filling materials which are capable of flow, comprises side and end walls of coated paper, cardboard or the like, which are joined by means of at least one sealing seam. Bending lines (7) are provided in the coated paper, cardboard or the like. So that the bending lines in such packaging remain undamaged in spite of a thin overall coating of plastics material on the paper web, even when processed in a manufacturing machine, it is provided that disposed in the region of at least some bending lines (7) is at lesat one plastics reinforcing strip (15) which engages thereover, such that the welding and contact surface (29) between the reinforcing strip (15) and the coated cardboard (61, 62) terminates from all sides at a spacing from the bending lines (7).

10 Claims, 8 Drawing Sheets

METHOD AND APPARATUS FOR MAKING PACKAGING MEANS HAVING REINFORCING STRIPS

This is a continuation of Ser. No. 725,034 filed Apr. 19, 1985, now abandoned, which is a division of Ser. No. 431,921 filed Sept. 30, 1982, now U.S. Pat. No. 4,526,314 issued July 2, 1985.

The present invention relates to a packaging means for filling materials which are capable of flow, comprising side and end walls which are joined by means of at least one sealing seam and which comprise coated paper, cardboard or the like in which bending lines are provided.

Packaging means or cartons for liquids, comprising paper which is coated with plastics material on both sides and which could also be referred to as board, paperboard or cardboard, are known. Such packaging means are used in particular for distributing milk. There is a very wide range of forms of milk packing means or cartons, including also a parallelepipedic shape. However, all milk packaging means or cartons have at least one sealing seam along which the web of paper, which is first drawn in a flat condition from a supply roll, is closed to form a tube. It will be appreciated that, when using plastics-coated paper webs, the closure operation is performed by means of welding or sealing.

In most liquid packaging means, at least at one side thereof, a pattern of bending lines is formed in the web of paper in order to facilitate mechanical folding, shaping and sealing operations. It is also known that the operation of bending or folding the paper, which is generally already previously coated with plastics material, stresses in the paper, or contact with tools, cause damage to the web of paper, at least in the plastics coating on the web of paper. However, such damage causes the packaging means to become pervious to liquid, which is obviously undesirable. It is precisely the action of sealing jaws on plastics-coated paper webs, and flow of the plastics material caused by the effect of heat, that give rise to undesired leakage areas. In order to prevent this, the web of paper carrier material has been coated with a layer of plastics material of suitable thickness, so that the above-mentioned disadvantages cannot arise.

In order to save material in the manufacture of liquid packaging means which are mass-produced, in particular plastics material, efforts have been made to make the coating of plastics material thinner, which is a development in the opposite direction to the efforts to increase the safety margin of the packaging means, as just referred to above. Therefore, consideration has already been given to securing reinforcing strips of plastics material to parts of the packaging means which are in particular danger, by a sealing joint. However, such processes have not achieved the desired result hitherto, for on the one hand the fact that the reinforcing strips are sealed onto the web of paper, which is coated with a thin layer of plastics material, over the entire area thereof, still gives rise to damage in the bending or welding operations, which in turn can result in leakage in the above-described manner. In addition, applying a reinforcing strip is a step which must be carried out by a separate operation in the packaging means production line, and accordingly increases costs.

The problem of the present invention is therefore that of providing a packaging means of the kind set forth above, wherein the bending lines remain undamaged in spite of the paper web being coated overall with a thin layer of plastics material, even when subjected to processing in the production machine.

The invention is also concerned with an apparatus for producing such a packaging means, comprising a plastics film supply roll arranged on one side of the coated paper web, and two mutually oppositely operative sealing jaws of which at least one is arranged movably.

In regard to the apparatus, the problem of the invention is directed to an improvement such that the reinforcing strip of plastics material can be satisfactorily applied to the desired location, under the specified conditions, without the entire production procedure in manufacture of the packaging being slowed down.

In regard to the packaging means, in accordance with the invention, the above-indicated problem is solved in that disposed in the region of at least some bending lines is at least one reinforcing strip of plastics material, which extends over said bending lines, in such a way that the welding and contact surface of the reinforcing strip with the coated cardboard terminates from all sides at a spacing in front of the bending lines.

It has been found that sealing reinforcing strips to the paper web, over the entire area thereof, is disadvantageous because, when bending is effected in the reinforcing region, high stresses are applied to parts of the reinforcing strip, which could result in leakage areas. If, in accordance with the invention, the welding and contact surface between the reinforcing strip and the thinly coated paper web terminates before the respective bending line, and only begins again thereafter, with that configuration occurring in the region of all bending lines, then a bending line pattern corresponding to the pattern of bending lines to be formed in the paper web is provided within the reinforcing strip. It will be appreciated that the reinforcing strip which is not welded in place in the region of the respective bending line is able substantially better to survive any stretch or extension effects. In other words, the line width of the weld-free region between the reinforcing strip and the coated paper web is equal to or wider than the bending lines themselves which are provided in the paper web. At those locations where bending lines intersect, there are cross-over points which are more or less of a circular configuration and which, being critical locations, are particularly, and above all, completely covered by weld-free regions of the reinforcing strip. It is only at a spacing around that region that the reinforcing strip is then welded or heat-sealed again to the plastics-coated paper web. Therefore, it is particularly advantageous for the reinforcing strip to be disposed in the region of at least some of those locations where at least two bending lines meet. In order to form an end of a packaging means or the closure arrangement of the packaging means at one end thereof by folding the paper web and sealing it closed, very severe bending operations must be performed in part, particularly at the locations where two or three bending lines come together, whether the lines meet or cross at those locations. At some locations is it inevitable that the coated paper web will be bent through for example 180°. It will be appreciated that the outer region is subjected to a considerable stretching effect and that a very thin plastics film which is sealed onto the paper over the entire area thereof could be torn off by virtue of such a severe bending operation. If however, in accordance with the invention, the reinforcing strip is disposed at those locations in the manner described hereinbefore, namely the weld-free region between the reinforcing strip of plastics material and the thinly coated cardboard is at a spacing from the intersection locations and extends therebeyond, then the sealing action is performed by a plastics cover strip which is subjected to a much lower level of loading, so that the leakage points observed hitherto no longer occur at the above-mentioned critical locations.

In this way it is possible to provide a liquid packaging means which has a particularly thin layer of plastics material on the web of carrier material, that is to say, on the pure paper, so that considerable amount of plastics material can be saved as a result. Nonetheless, the consumer is provided with a liquid packaging means which operates satisfactorily, that is to say, it is liquid-tight and easy to open, when of a suitable configuration. Liquid-tightness, namely eliminating dangerous leakage locations, is achieved by applying the reinforcing strip in the manner described hereinbefore.

In accordance with the invention, it is also desirable for the region of the bending lines to be restricted to the block bottom zone at one end of the packaging means. In order to make further savings in material in liquid packaging means, packaging means are now produced with a cross-section which as far as possible is round because such a cross-sectional configuration affords the maximum filling volume, for a given amount of packaging material used. For example, a packaging means has been proposed, which comprises a tube with a cover and bottom portion. While the tube is made from the plastics-coated paper web, the cover portion comprises thermoplastic material without a carrier material. On the other hand, the bottom portion is formed in the manner referred to as a block bottom, of the usual square or rectangular configuration with folded-over triangular flaps. If a packaging means of such a configuration is used, in accordance with this invention, then it is sufficient merely to apply a single reinforcing strip, namely at that location on the packaging means blank which represents the block bottom region.

In this connection, it is particularly desirable if, in accordance with the invention, the region of the bending lines on the packaging means blank is only on one edge thereof, and the reinforcing strip is in the form of an elongate rectangle. It will be appreciated that this enables the machine to be simplified, while the cycle times generally is modern high-speed machinery can be maintained at a high level.

In regard to the apparatus for producing the packaging means of the kind set forth above, the problem is solved, in accordance with the invention, in that the face of the sealing jaw, which is towards the surface of the paper web, which is to be treated, comprises at least in part grooves arranged in accordance with the pattern of the bending lines. The cross-sectional shape of the grooves may be quadrangular, in particular rectangular, or rounded, in particular circular, oval or the like. The grooves preserve the region of the bend line from welding or sealing engagement of the sealing jaw with the thinly coated paper web. Even slight damage to the thin coating of plastics material in the region of the reinforcing strip is sealed off again by applying the plastics reinforcing strip with the above-indicated manufacturing apparatus. In addition, there is no fear of fresh leakage locations, for the reinforcing strip applied to the packaging means forms, in the region of the bending lines, loose regions which are movable relative to the paper web and which can carry considerable loadings when stressed are applied, without tearing.

In accordance with the invention, it is desirable for the axis of rotation of the supply roll to be arranged transversely with respect to the direction of transportation of the paper web. In contrast to the arrangement which has already been considered, which involves applying one or more reinforcing strips to the paper web from the side transversely with respect to the direction of movement or transportation thereof, the arrangement of the supply roll in the above-defined manner permits a long period of use thereof for, because the reinforcing strip is frequently comparatively narrow, performance of the entire manufacturing process may in this way involve only a few changes of roll.

A further preferred embodiment of the invention is charactersied in that the sealing jaw which is arranged on the side of the paper web, which is to be treated, is driven movably substantially normal to the plane of the paper web, and is provided with a severing welding means. Preferably, the production apparatus is of such a design that the paper web which is thinly coated with plastics material and which is initially flat is transported horizontally and, in the course of that conveying movement, the reinforcing strip is laid from above onto the paper web. In other words, the surface of the paper web which is to be treated is upwards, while the co-operating jaw is arranged stationarily below it in such a way that the paper web is conveyed over the bottom jaw. It will be appreciated that the operation of sealing the reinforcing strip in place occurs in a cyclic manner so that the paper web is only advanced when the preferably vertically movable upper sealing jaw is in the raised position. The severing welding means which is preferably arranged at the downstream edge of the sealing jaw, as viewed in the direction of movement of the paper web, means that there is no need for a separate cutting means, especially as the heat for the severing-welding operation is available in any case. Use of the combined severing-welding operation, which is considered as a particularly simple procedure by persons skilled in the art, advantageously makes it possible to eliminate overhanging or upwardly projecting edges on the reinforcing strip which is secured in place on the paper web by a sealing action, so that there is no danger of any fouling or soiling. The production apparatus defined hereinbefore seals the reinforcing strip to the paper web, up to the severing location.

It is even desirable for the sealing jaw, at its trailing edge, to extend one or two millimeters for example beyond the reinforcing strip or the region to which the reinforcing strip is to be secured by a sealing action. That then ensures that the sealing joint is produced without any doubt, as far as the edge of the reinforcing strip, even when tolerances are involved, and there is no damage to the layer of plastics material on the paper web for the reason that at that location the blank terminates at the edge of the reinforcing strip, particularly when employing the above-described packaging means which has a block bottom arrangement.

It is also advantageous in accordance with the invention to provide at least one clamp means which is movable in a controlled fashion synchronously with respect to the movement of the sealing jaw, for advancing the plastics film by the width of the reinforcing strip, between the sealing jaw and the paper web. The clamp means may advantageously also co-operate with the severing welding means in such a way that, directly after the severing welding operation, a brief retraction or pull-back movement of the web of film is effected, from the reinforcing strip which was last sealed in position, so as to produce a cleaner cut and prevent fraying.

It is desirable for the next reinforcing strip to be pulled from the supply roll by way of a movably disposed and drivable pull-off roller, in such a way that, after the temporary pull-back movement referred to above, the clamp means clamps the web of film or foil on a feed or delivery surface so that the movement of the pull-off roll pulls film or foil from the supply roll, by increasing the length of the path of movement of the web of film or foil.

Further advantages, features and possible uses of the present invention will be apparent from the following description, with reference to the drawings in which.

Figure 1:
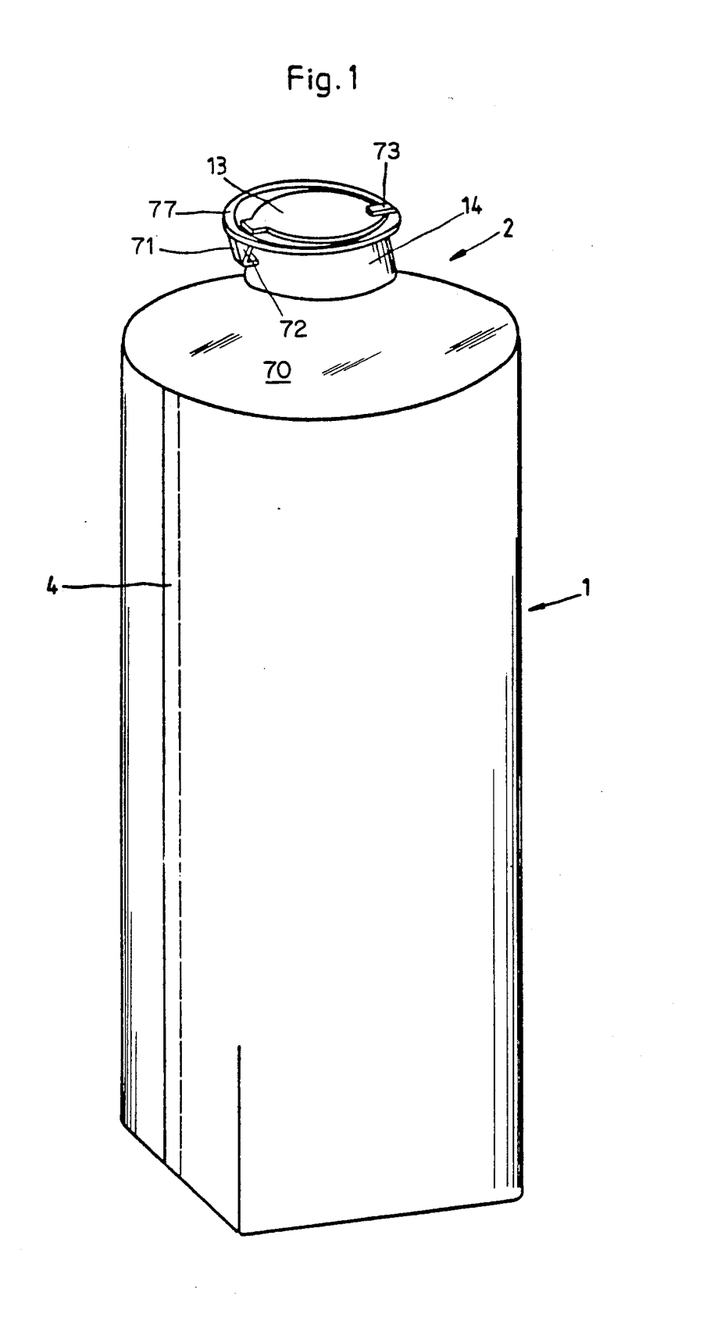
FIG. 1 is a perspective view of a particularly preferred packaging means in which the end wall at the cover end comprises plastics material without a carrier material, whereas in this embodiment the bottom end wall is of a square configuration, in the form of a block bottom.
Figure 2:
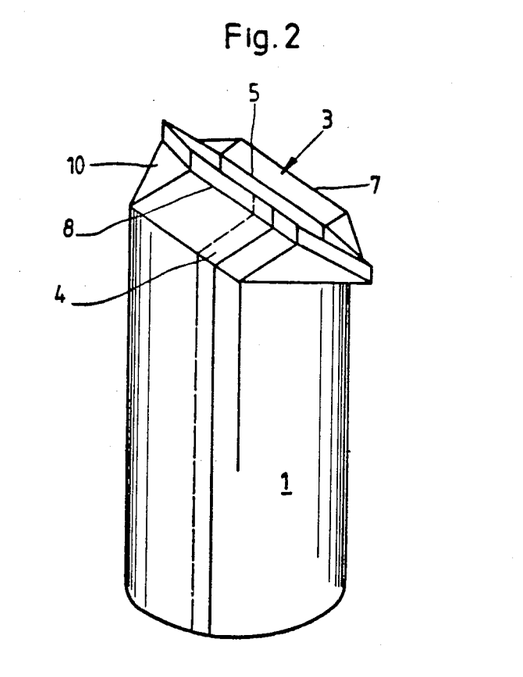
FIG. 2 shows the tubular side walls of the packaging means shown in FIG. 1 in an inverted position so that the bottom which is not yet fully finished is at the top, towards the person viewing the joint.
Figure 3:
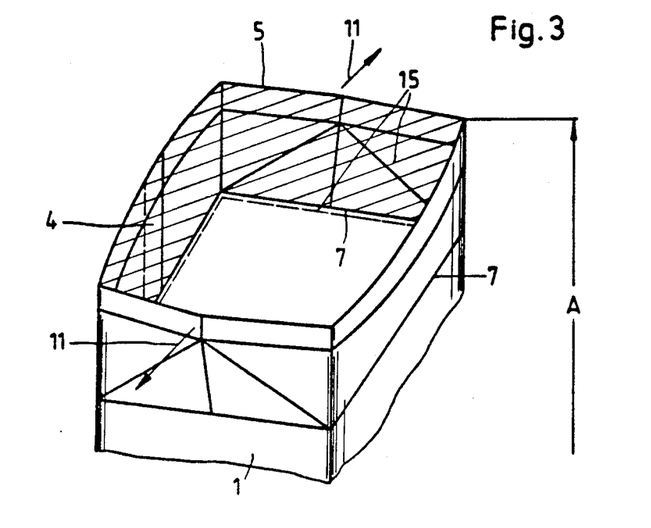
FIG. 3 shows the bottom end of the tubular side walls of the packaging means shown in FIG. 2, to show the configuration of the bending lines.

The specific packaging means which is shown in a finished condition in perspective view in FIG. 1 and of which only part is shown in FIGS. 2 and 3 comprises side wall 1 which are of a tubular configuration, a cover portion 2 of plastics material without carrier material, the cover portion 2 being joined to the side walls 1 by an injection process at the top end as shown in FIG. 1, and a bottom portion 3 which is arranged at the opposite end to the cover portion 2. Taking the paper web 61 (see FIGS. 4 to 9) which is initially in a flat condition in manufacture of the illustrated packaging means, the tubular side walls 1 are closed up to form the tubular configuration shown in FIGS. 1 and 2, by means of a longitudinal sealing seam 4. In this packaging means, after the tube portion has been produced, that is to say, after the longitudinal sealing seam 4 shown in FIG. 1 has been formed, the cover portion is injected onto the top thereof. It comprises a frustoconical cover wall portion 70, and a cylindrical or slightly frustoconical spout or mouth rim portion 14 which projects upwardly from the centre of the cover wall portion 70. The rim portion 14 is closed by means of a closure member 13 which is connected by way of a tongue or bar portion 73 to the gripping ring 77. The hinge 72 is also provided for the closure member 13, while the gripping ring is attached to the hinge by way of the attachment strip 71. To open the packaging means, the user thereof tears off the strip 71, pulls up the gripping ring 77 and thus tears the closure member 13 off the rim portion 14. After the packaging means has been opened in that way, it can be re-closed by using the closure member 13 and the hinge 72 thereof.

At the end of the packaging means opposite the cover portion 2 as shown in FIG. 1 is the bottom portion 3 which can be particularly clearly seen from FIGS. 2 and 3. It will be seen that in this case the longitudinal sealing seam 4 goes over into the double cardboard strip 8 and the packaging means at this end finally terminates at the edge 5. The lines 7 shown in FIGS. 2 and 3 are formed by folding in the appropriate portions of the packaging means, in the manner shown in FIG. 2. As shown in FIG. 2, the lines 7 define the packaging means and hereinafter, together with the other lines, represent the bending lines 7. If the bottom end of the packaging means, which is folded to form a quadrilateral as shown in FIG. 3, is pulled apart in the manner indicated by the arrows 11, and folded into the condition shown in FIG. 2 along the bending lines 7, the result is then also the double-layer triangular flaps 10. There is no need at this point to describe in greater detail the way in which the doubled cardboard strip 8 is sealingly closed after the packaging means has been filled, and the triangular flaps are secured to the bottom portion after having been folded over thereonto.

As can be particularly clearly seen from FIG. 3, the liquid packaging means produced in the above-indicated manner is provided at its bottom end with a reinforcing strip in the region of all bending lines 7. The reinforcing strip extends completely over the bending lines and is secured by welding in a given manner to the inside of the paper web which is thinly coated with plastics material, in such a way that the welding and contact surface between the reinforcing strip 15 on the one hand and the coated paper web on the other hand terminates from all sides at a spacing from the bending lines 7, as will be described in greater detail hereinafter.

Figure 4:
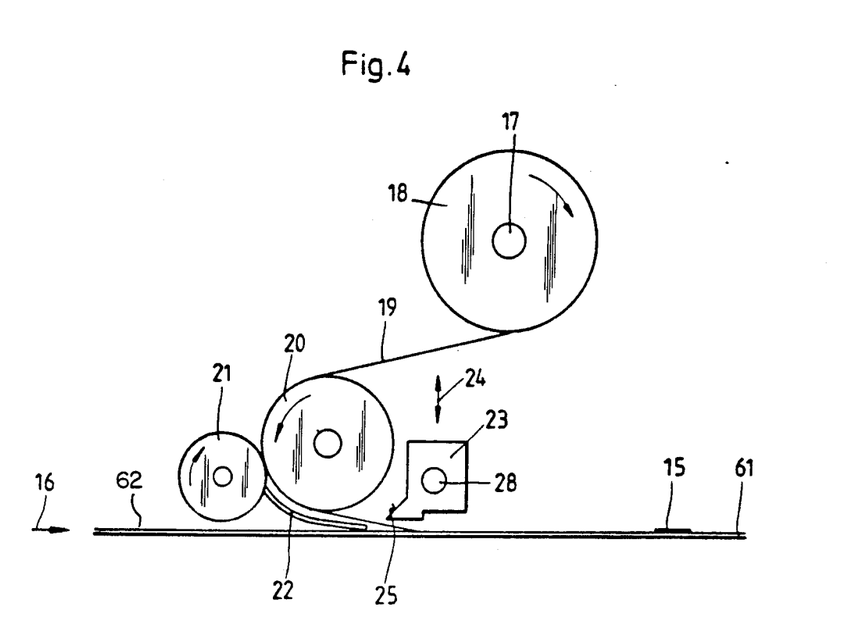
FIG. 4 is a diagrammatic side view of the apparatus for applying the reinforcing strip to the paper web.
Figure 5:
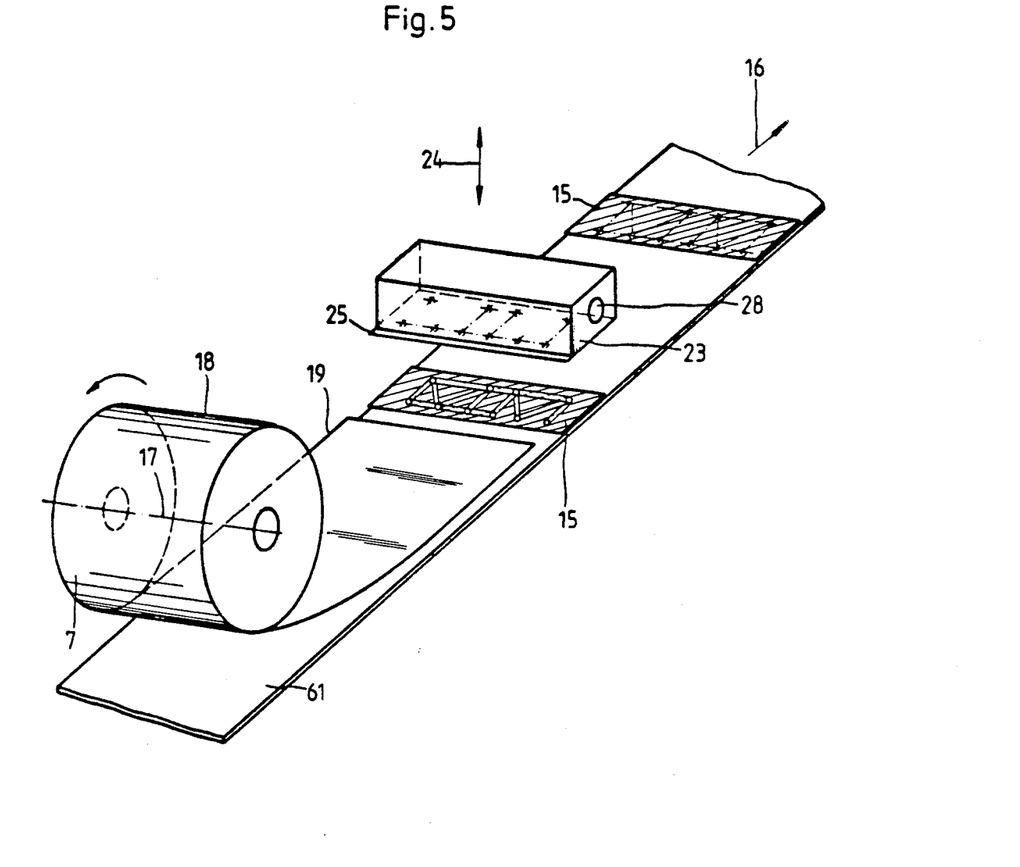
FIG. 5 is a diagrammatic perspective view of the apparatus for applying the reinforcing strip, with some machine components omitted.

First of all, FIGS. 4 and 5 show diagrammatic views of the basic principle of the manner in which the reinforcing strip 15 is sealed to the paper web 61 which is thinly coated with plastics material 62. The axis of rotation 17 of a supply roll 18 with the plastics film or foil which if drawn off in the form of the web 19 in the direction indicated by the arrow 20, extends transversely with respect to the direction of transportation of the paper web 61, as indicated by the arrow 16. FIG. 4 shows the way in which the web 19 of plastics film or foil is taken around the drive roller 20 and co-operating or backing roller 21, and over a guide plate member 22, under the upper sealing jaw 23. The lower sealing jaw is not shown in the drawings. The sealing jaw 23 is disposed at the side of the paper web 61 whose surface or plastics coating 62 is to be treated, that is to say, joined to the reinforcing strip 15. The sealing jaw 23 is arranged to be movable vertically up and down, as indicated by the double-headed arrow 24.

Figure 7:
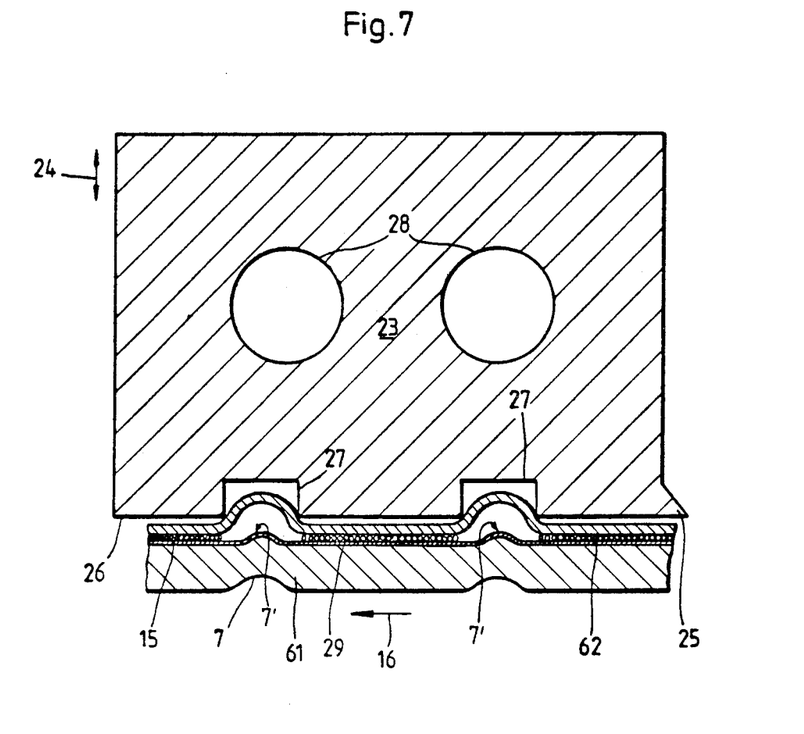
FIG. 7 is a cross-sectional view of the sealing jaw, with diagrammatic illustration of its engagement activity.
Figure 8:
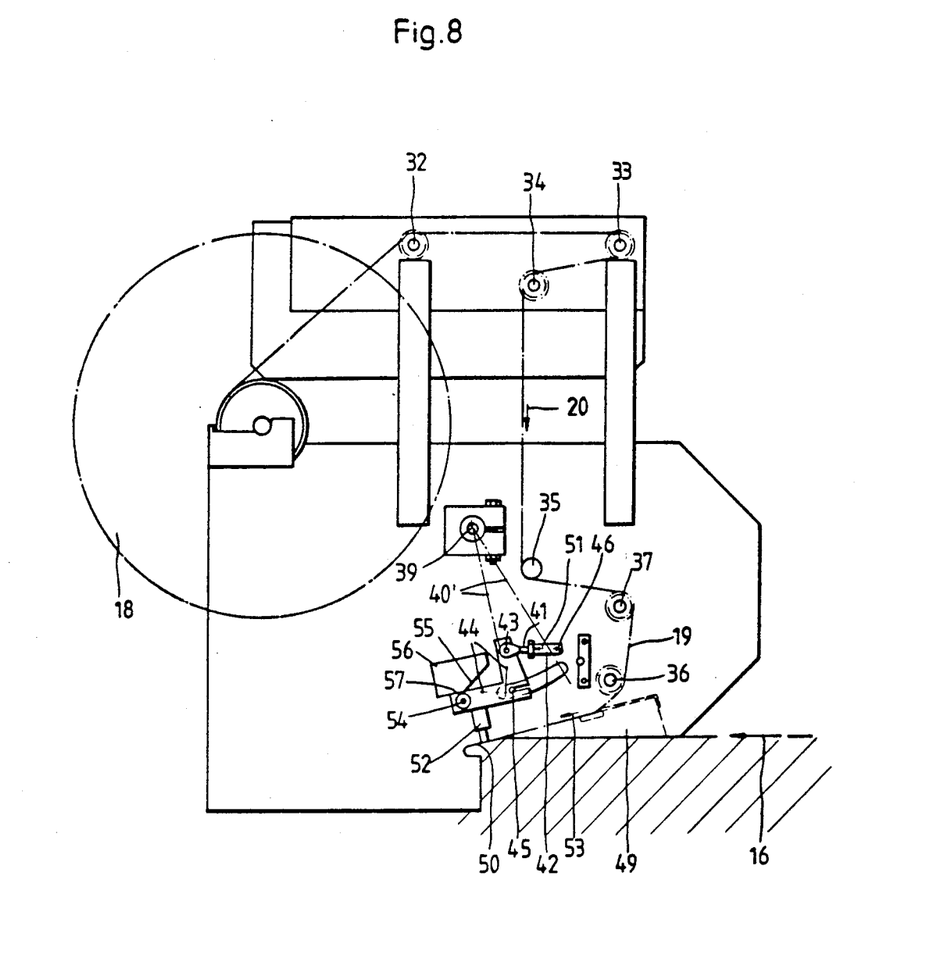
FIG. 8 shows a part of the forward feed and control arrangement for the web of plastics material, for applying reinforcing strips to the paper web.
Figure 9:
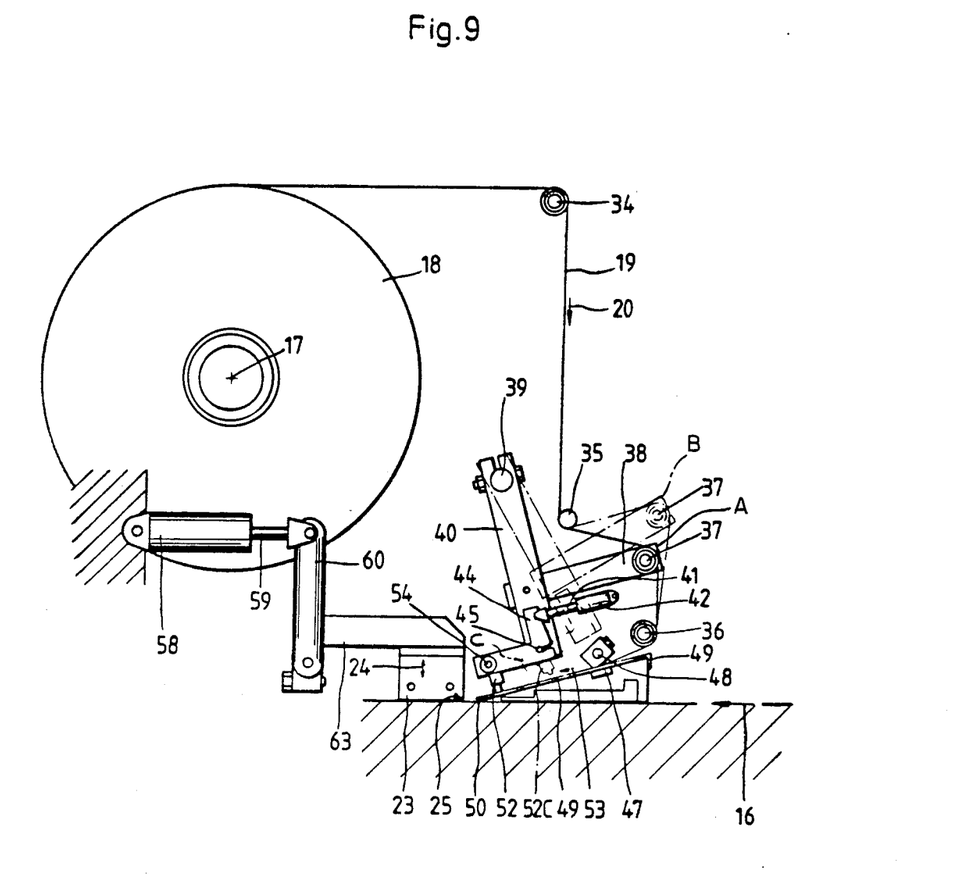
FIG. 9 shows the same machine as that shown in FIG. 8, except that other machine components are shown, to illustrate the mode of feeding the respective reinforcing strip.

The mode of operation of the apparatus is shown diagrammatically in FIGS. 4 and 5, illustrating that the drive roller 20 intermittently advances the web 19 below the sealing jaw 23, with a forward feed means which will be described in greater detail hereinafter with reference to FIGS. 8 and 9. Each intermittent movement of the web 19 under the sealing jaw is over a distance corresponding to the width of a reinforcing strip 15. When the leading edge of the web 19, that is to say, the reinforcing strip 15 which is the next one to be secured in position by a sealing action, is disposed below the sealing jaw 23 and over the correct position on the paper web 61, then the sealing jaw moves downwardly as indicated at 24, and seals the reinforcing strip 15 in place. At the same time as that operation, the severing-welding operation is performed by means of the severing-welding device 25 which may be for example an extended or projecting wedge member as shown in FIGS. 4, 5 and 7 or an edge 25' as shown in FIG. 9. When the material reaches the softening temperature or severing-welding temperature, the web 19 is torn away from the secured reinforcing strip 15 by briefly reversing the direction of drive of the roller 20. The paper web 61 is then advanced intermittently again in the direction indicated by the arrow, and the forward feed movement of the film or foil web 19 is then re-commenced, to apply the next reinforcing strip. The forward feed or pull-back movements referred to above are produced in a somewhat different manner in the specific embodiment described with reference to FIGS. 8 and 9, namely, not with the drive roller 20 and the co-operating roller 21.

Figure 6:
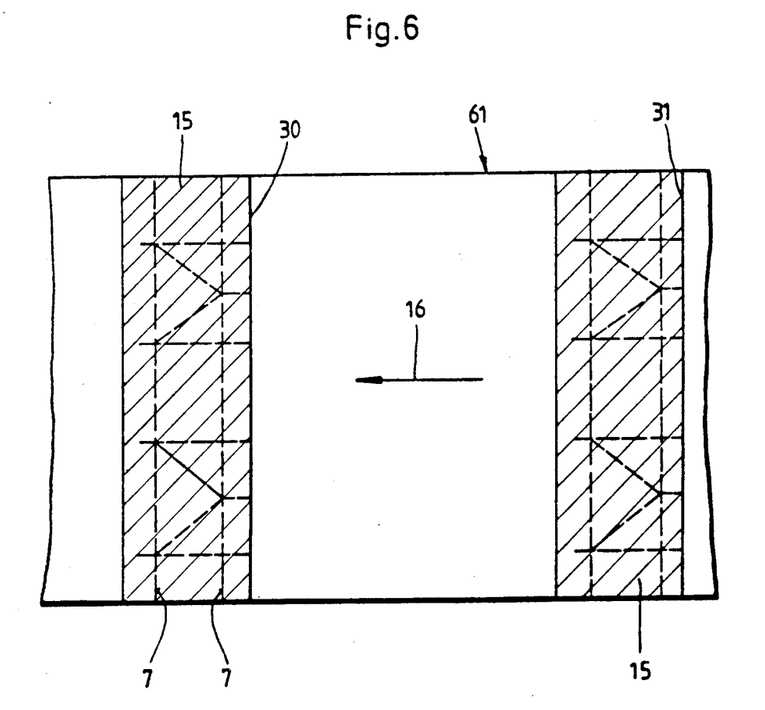
FIG. 6 is a view of a part of the paper web with the pattern of bending lines on the individual blanks.
Figure 6A:
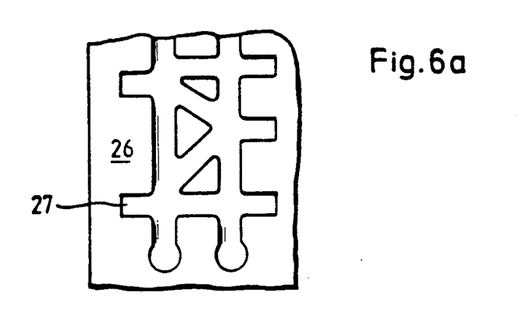
FIG. 6a shows a broken-away view on an enlarged scale of a portion of the grooves in the sealing jaw, corresponding to the pattern of bending lines.

Reference will now be made to FIGS. 5 to 7 showing the face 26 of the sealing jaw 23, which is towards the thin top plastics coating or surface 62 to be treated, of the paper web 61. FIG. 6a shows a direct plan view of the surface 26 of the sealing jaw 23, with a channel-like pattern which corresponds to the pattern of the bending lines 7 shown in FIG. 6. The pattern shown in FIG. 6 in the operative surface 26 of the sealing jaw 23 is formed by grooves 27, the cross-sectional configuration of which can best be seen from FIG. 7. The channel system shown in FIG. 6a is therefore simply grooves 27 formed in the surface of the jaw, in a configuration which corresponds to the pattern of the bending lines 7 in the paper web 61. It would also be sufficient for only the critical locations to be reinforced or strengthened.

The cross-sectional view shown in FIG. 7 illustrates, starting from the bottom of the drawing and going upwards therein, the paper web 61 which moves in the direction indicated by the arrow 16, and the thin plastics layer 62. The coated paper web 61 with the plastics layers 62 thereon has the bending lines 7 at two selected locations, such that the thin plastics layer 62 together with the paper web 61 is raised in a rib-like configuration at 7', on the top side of the laminate web. The reinforcing strip 15 is shown as being laid thereover (all layers 61, 62 and 65 are broken away at the right-hand and left-hand sides in the drawings), and curves over the ribs 7' to a greater or lesser degree into the grooves 27 in the sealing jaw 23, with the curved portions and grooves being illustrated in an exaggerated fashion. For that purpose for example heating or cooling passages 28 are only indicated in highly diagrammatic form. FIG. 7 shows welding and contact surfaces 29 as between the reinforcing strip 15 and the thin plastics layer 61. It will be seen that the welding and contact surfaces 29 are provided only under the operative surface 26 of the sealing jaw 23 at locations where there are no grooves 27. In other words, each welding and contact surface 29 between the reinforcing strip 15 on the one hand and the thin plastics layer 62 on the paper web 61 on the other hand terminates in front of the bending line 7, and then continues thereafter, as far as the next bending line, and so forth. Therefore, there is a weld-free area in the region of the bending line.

The blank shown in FIG. 6 is suitable for making up the side walls 1 of the packaging means shown in FIGS. 1 to 3, including the bottom portion 3. In this case, the blank shown in FIG. 6 is moved from right and left in the direction indicated by the arrow 16 directly between two further blanks, forming the paper web 61. Therefore, the blank begins at the edge 30 and terminates at the edge 31 at which the next following blank begins. The drawing also shows the simple quadrilateral shape of the blank on which the region of the bending line 7 occurs only at the right-hand edge, being the trailing edge as viewing in the direction of transportation movement indicated by the arrow 16. In this case, the reinforcing strip 15 may be in the shape of an elongate rectangle and is sealed in position at the right-hand edge, beside the line 61, over the area indicated by hatching.

Another and particularly preferred embodiment of the feed means for advancing the film web 19 to form the reinforcing film or foil strip 15 will now be described with reference to FIGS. 8 and 9.

The film or foil web 19, in this case polyethylene, is pulled off the supply roll 18, around direction-changing rolls 32, 33, 34, 35 and 36, by way of a drive means which is shown in FIG. 9 in the form of a pull-off feed roller 37. The feed roller 37 is carried by means of an arm 38 on a lever 40 which is rotatable about an upper pivot point 39. The lever 40 is only diagrammatically indicated in FIG. 8, in the form of radii 40'. In its lower region, a push rod 41 of a pneumatic cylinder 42 engages the upper pivot point 43 of a L-shaped lever 44 which is mounted rotatably about a pivot point 45 on the lever 40. When the rod 41 pulls the lever 40 towards the right in the direction indicated by arrow 46 (FIG. 8), the roller 37 is moved from position A in FIG. 9 into position B. As a means for blocking return movement of the film web 19, comprising a rubber bar member 47 providing a high degree of friction, and a rotary member 48, retains the film web 19 in the region of the rubber bar member 47 as shown in FIG. 9, a portion of web 19 is drawn off the supply roll 18 and stored in the region of the feed roller 37, when the feed roller 37 is moved upwardly into position B.

The movement of the rod 41 of the pneumatic cylinder 42 towards the right in the direction indicated by arrow 46 and thus the pivotal movement of the lever 40 about the upper pivot point 39 in a counter-clockwise position also causes the angle lever 44 to be moved into the position C shown in broken lines in FIG. 9. In that condition, the web 19 is disposed above a tapered or wedge-like slide plate 49, in such a way that the leading edge 50 is disposed at a small spacing of for example 5mm from the severing welding edge 25' of the sealing jaw 23. If the direction of actuation of the pneumatic cylinder 42 is reversed so that the rod 41 now moves towards the left in the direction indicated by arrow 51, the above-mentioned means for blocking return movement of the film 19 is lifted by the rotary member 48 being lifted away from the rubber bar member 47. At the same time, the angle lever 44 can pivot about its pivot point 45 in a counter-clockwise direction so that a rubber punch member 52, with a surface providing a high degree of friction, moves downwardly substantially into the position indicated at 52C in FIG. 9, and comes to bear against the film web 19.

So that the angle lever 44 can reliably rotate about the pivot point 45 in the counter-clockwise direction when the lever 40 is pivoted in the clockwise direction, the upper pivot point 39 of the lever 40 provides a certain resistance to movement, that is to say, it produces a certain retarding or braking action in regard to rotary movement of the lever 40.

By virtue of the rubber punch member 52 bearing against the web 19 of film material from above, the web 19 can be advanced towards the left and downwardly in the direction indicated by the arrow 53 with a sliding movement on the plate member 49, with the angle lever, for the angle lever 44 is moved towards the left in the direction indicated by the arrow 51, together with the lever 40, with the rubber punch member 52 in its condition of bearing against the web 19, by virtue of the movement of the rod 41.

During that movement, a roller 54 secured to the outer left-hand arm of the angle lever 44 moves at a spacing below an inclined surface 55 on an angular guide member 56 which is arranged approximately in a region to the left of and beside the point 43 of attachment of the rod 41 to the angle lever 44. When the leading edge 50 of the web 19 has reached the severing-welding edge or trailing edge 25' of the sealing jaw 23, the roller 54 has moved towards the left on a cam surface 57 by the above-mentioned distance of 5 mm which is selected by way of example, from the inclined surface 55 of the guide member 56. The cam surface 57 ensures that the rubber punch member 52 remains in secure pressing engagement with the film web 19.

The leading edge 50 of the film web 19 is on the one hand the leading edge of the next reinforcing strip 15, but at the same time it is the leading edge of the reinforcing strip 15 which is subsequently fed forward, in conjunction with the film web 19. When therefore the above-mentioned condition is attained, in which the roller 54 is positioned under the cam surface 57, then as shown in FIG. 9 the sealing jaw 23 is lifted upwardly in the direction indicated by the arrow 24 and the foremost reinforcing strip 15 is so disposed below the sealing jaw 23 that the trailing edge thereof is under the severing-welding edge 25', beside which is disposed the leading edge of the next reinforcing strip 15 and thus the leading edge 50 of the web 19, in the above-described manner.

After the piston 59 of the pneumatic cylinder 58 has rotated the drive lever 60 and thus the support arm 63 of the sealing jaw 23, in such a way that the sealing jaw is pressed firmly downwardly in the direction indicated by the arrow 24, and the sealing and severing-welding temperature has been attained, the film web 19 performs the return movement, which has been referred to above in a different context, over the above-mentioned distance of 5 mm, so that the leading edge 50 of the film web 19 resumes the position shown in FIG. 9.

This return movement of the film web is effected by the direction of actuation of the pneumatic cylinder 42 being reversed so that the rod 41 moves towards the right again in the direction indicated by the arrow 46. This causes the lever 40 to be pivoted about its pivot point 39 in a counter-clockwise direction, by means of the angle lever 44, with the angle lever 44 being pulled towards the right in FIG. 8. It cannot at first pivot about its pivot point 45 for the roller 54 is held down by the cam surface 57. That causes the rubber punch member 52 to remain pressing against the film web 19, whereby it is pulled back by the above-mentioned distance of 5 mm, as required. That produces a cleaner cut, and avoids fraying of the reinforcing strip. After the above-mentioned pull-back movement over a distance of 5 mm has taken place, the joint between the cam surface 57 and the inclined surface 55 of the angle guide member 56 is reached, and, by virtue of the upper pivot point 39 of the lever 40 providing resistance to movement, the angle lever 44 can now rotate about its pivot point 45 in a clockwise direction, because the roller 54 can now move up along the inclined surface 55. Because of that however, the rubber punch member 52 is lifted off the film or foil 19 and can move back from the position shown in solid lines in FIG. 9, into position 52C.

Controlled in synchronism therewith, the means for preventing return movement of the web now comes into action again by the rotary wedge member 48 being pressed against the rubber bar member 47. During the above-described pivotal movement of the lever 40 about its pivot point 39 in the counter-clockwise direction, the feed roller 37 is again moved from its position A into position B, in order to feed film web 19 forward.

The working cycle is now repeated in the above-described manner.

I claim:

1. A method of operating upon a continuous web of blanks for the production of a plurality of packaging means, the blank web being formed of a coated foldable sheet material, each of the blanks of the blank web including first and second surfaces and a plurality of bending lines, said bending lines being restricted to only a portion of each of said blanks, said bending lines further having a width and a height, and defining a pattern, said pattern being repeated upon each of said blanks, said method comprising the steps of:
   intermittently advancing the blank web along a blank web path;
   intermittently advancing a plastic film web along a film web path to adjacent said first surface of the blank web;
   locating first and second sealing jaws on opposite sides of said web path for passage of said web and film therebetween, said first sealing jaw defining a first planar sealing surface parallel to said first surface of said blank web and said second sealing jaw defining a second planar sealing surface parallel to said second surface of the blank web;
   said first sealing surface of said first sealing jaw having defined therein a plurality of grooves, said grooves being formed to correspond to said pattern of the bending lines, each of said grooves having a width and depth greater than said width and height of the corresponding bending line;
   heating said first sealing jaw;
   moving at least one of said first and second sealing jaws away from said web path and toward said web path to selectively exert pressure upon said blank and film webs, whereby said film is sealed to said blank in the portion of the blank surrounding said bending lines, but with said film being unsealed along said bending lines; and
   severing the portion of the film web adjacent to the blank web from the remainder of the film web, said severing including defining a severing edge on said first sealing jaw, and moving said film web slightly in a reverse direction following engagement of said first and second sealing jaws, whereby said film web is severed from a portion of the film disposed between said sealing jaws.

2. The method as defined in claim 1, wherein said film web is advanced from a roll supported along one side of said blank web path such that the axis of rotation of the roll extends transversely with respect to said blank web path.

3. The method as defined in claim 1, wherein said first sealing jaw is moved toward and away from said web path in a direction normal to said first surface of said blank web.

4. The method as defined in claim 1, wherein advancing of said film web includes selectively clamping the flim web with means for clamping, and moving said clamp means along said film web path by a predetermined amount, whereby the film web is advanced by the predetermined amount for use as a reinforcing strip.

5. Apparatus for operating upon a continuous web of blanks for the production of a plurality of packaging means, the blank web being formed of a coated foldable sheet material, each of the blanks of the blank web including first and second surfaces and a plurality of bending lines, said bending lines being restricted to only a portion of each of said blanks, said bending lines further having a width and a height, and defining a pattern, said pattern being repeated upon each of said blanks, said apparatus comprising:

means for intermittently advancing the blank web along a blank web path;

means for supporting a roll of a plastic film web along one side of said blank web path;

means for intermittently advancing the film web along a film web path from the roll to adjacent said first surface of the blank web;

first and second sealing jaws disposed on opposite sides of said web path for passage of said web and film therebetween, said first sealing jaw defining a first planar sealing surface parallel to said first surface of said blank web and said second sealing jaw defining a second planar sealing surface contiguous and parallel to said second surface of the blank web;

means for moving said first and second sealing jaws toward and away from each other to selectively position said first planar surface against said second planar surface with a blank disposed therebetween;

means for heating said first sealing jaw;

said first sealing surface of said first sealing jaw having defined therein a plurality of grooves formed to lie along a plurality of imaginary lines arranged on said first planar surface with said imaginary lines intersecting to define intersecting grooves, whereby heat from said first sealing jaw is applied to said second sealing surface and any blank therebetween along said first planar surface with the exception of along said imaginary lines; and means for severing the portion of the film web adjacent to the blank web from the remainder of the film web, said severing means including said first sealing jaw which defines a severing edge thereon, said heating means, and means for moving said film web slightly in a reverse direction following engagement of said first and second sealing jaws and application of heat thereto, whereby said film web is severed at said edge from a portion of the film disposed between said sealing jaws.

6. Apparatus as defined in claim 5, wherein said roll-supporting means supports the roll such that the axis of rotation of the roll extends transversely with respect to said blank web path.

7. Apparatus as defined in claim 5, wherein said first sealing jaw moving means is operative to move said first sealing jaw in a direction normal to said first surface of said blank web.

8. Apparatus as defined in claim 5, wherein said film advancing means includes means for selectively clamping the film web, and means for moving said clamp means along said film web is advanced by the predetermined amount, whereby the film web is advanced by the predetermined amount for use as a reinforcing strip.

9. Apparatus as defined in claim 5, wherein said severing edge is defined on said first sealing jaw as a leading edge of said first jaw with respect to the normal direction of movement of the blank web.

10. Apparatus as defined in claim 5, wherein said severing edge is defined on said first sealing jaw along a wedge member extending parallel to the blank web from a leading edge of said first jaw with respect to the normal direction of movement of the blank web.

* * * * *